United States Patent
Kivits et al.

(10) Patent No.: US 8,488,424 B1
(45) Date of Patent: *Jul. 16, 2013

(54) WRITE STRATEGY CALIBRATION FOR OPTICAL DRIVES

(75) Inventors: Peter Kivits, Waalre (NL); Julie Faminial, Mandaluyong (PH); Jake Ballares, Laguna (PH); Jents Temmerman, Hove (BE)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/456,877

(22) Filed: Apr. 26, 2012

Related U.S. Application Data

(63) Continuation of application No. 12/022,046, filed on Jan. 29, 2008, now Pat. No. 8,174,944.

(60) Provisional application No. 60/887,255, filed on Jan. 30, 2007.

(51) Int. Cl.
*G11B 7/00* (2006.01)

(52) U.S. Cl.
USPC ............................. 369/44.29; 369/47.53

(58) Field of Classification Search
USPC .......................... 369/47.53, 47.29
See application file for complete search history.

(56) References Cited

U.S. PATENT DOCUMENTS

| | | | |
|---|---|---|---|
| 5,574,706 A | 11/1996 | Verboom et al. | |
| 7,236,438 B2 * | 6/2007 | Furumiya et al. | 369/59.12 |
| 7,436,745 B2 | 10/2008 | Kim | |
| 7,570,549 B2 | 8/2009 | Van Endert et al. | |
| 7,623,420 B2 | 11/2009 | Bahng | |
| 7,639,577 B2 | 12/2009 | Roh | |
| 7,957,239 B2 * | 6/2011 | Ueno | 369/47.53 |
| 7,978,580 B1 | 7/2011 | Kivits et al. | |
| 2004/0264330 A1 | 12/2004 | Roh | |
| 2005/0052976 A1 * | 3/2005 | Kim | 369/47.53 |
| 2005/0068871 A1 | 3/2005 | Weirauch | |
| 2007/0030783 A1 | 2/2007 | Van Endert et al. | |
| 2007/0171805 A1 | 7/2007 | Shigeta et al. | |
| 2008/0106985 A1 | 5/2008 | Hasebe et al. | |
| 2008/0192598 A1 | 8/2008 | Jayaraman et al. | |
| 2008/0205210 A1 | 8/2008 | Van Endert et al. | |
| 2009/0122680 A1 | 5/2009 | Van Endert et al. | |
| 2009/0262616 A1 * | 10/2009 | Tang et al. | 369/47.53 |

OTHER PUBLICATIONS

"Write-Recalibration in Single- and Dual-Headed Optical Disk Drives," IBM Tech. Disclosure Bulletin, vol. 34, No. 9, Feb. 1992, Armonk, NY, pp. 70-71.

"Taguchi Design Tutorial," Design-Ease 6 User's Guide, http://www.statease.com/36ug/DE05-Taguchi/pdf., Rev. Jan. 10, 2001, pp. 5-1 to 5-9.

"Running Optimum Power Control: Data Integrity in CD-Recording," Optical Storage Technology Association, Jan. 7, 1998.

(Continued)

*Primary Examiner* — Van Chow

(57) ABSTRACT

Laser write parameters in an optical drive are calibrated. A parameter range for the write parameters is set based on a recordable medium, and a number of test runs are recorded on the recordable medium while varying the write parameters. Write performance characteristics over the test runs are measured. Based on the measured performance characteristics, actual write parameters are selected for use in writing actual data.

19 Claims, 8 Drawing Sheets

OTHER PUBLICATIONS

"Taguchi Approach to Design of Experiments," American Society for Quality (ASQ), published Oct. 4, 2006.

"Write Strategies for high performance DVD+R/RW," Phillips, pp. 1-5, published Oct. 29, 2004.

"Data interchange on 120mm and 80mm Optical Disk using +R Format-Capacity: 4,7 and 1,46 Gbytes per Side," Standard ECMA-349, 3rd Edition, Dec. 2005.

* cited by examiner

WRITE STRATEGY CALIBRATION FOR OPTICAL DRIVES

CROSS-REFERENCE TO RELATED APPLICATIONS

This application is a continuation of U.S. patent application Ser. No. 12/022,046, filed Jan. 29, 2008, which claims the benefit of U.S. Provisional Patent Application No. 60/887,255, filed Jan. 30, 2007, the contents of each of which are hereby incorporated by reference as if fully stated herein.

FIELD

The present disclosure generally concerns the determination of optical laser drive write parameters for a recordable medium such as a CD or DVD.

BACKGROUND

Optical drives are commonly used to write data to the surface of a recordable medium such as a CD or DVD. Specifically, optical drives use a laser to create "pits" and "lands" on the surface of the recordable medium, and the pits and lands are detected to reproduce data.

In the optical drive, write strategy parameters determine how the laser writes to the recordable medium. For example, standard address in pre-groove (ADIP) information on the recordable medium may include recommended write strategy parameters such as the power of the laser, the tilt of the laser, and so on. Examples of write parameters on a castle waveform are shown in FIG. 5. Nevertheless, a drive developer might believe certain write strategy parameters are optimal, and program such parameters into the drive firmware as default values. Consequently, the drive's firmware values may overwrite the parameters from the recordable medium's ADIP information.

In the field, optical drive writing performance often varies due to factors such as manufacturing differences between optical drives, and between recordable media (e.g., a disc type is DVD+R, CD-RW, or BD double layer, etc., whereas a brand of disc is Princo, Ricoh, Ritek, Sony, etc.), and differences between disc speeds. For the same reason, it is also ordinarily difficult to compensate for environmental conditions in the field such as temperature. Thus, write strategy parameters that provide good writing performance characteristics for one media may perform poorly when applied to others.

SUMMARY

The foregoing situation is addressed by providing improved write strategy calibration for optical drives.

Thus, in one aspect, laser write parameters in an optical drive are calibrated. A parameter range for the write parameters is set based on a recordable medium, and a number of test runs are recorded on the recordable medium while varying the write parameters. Write performance characteristics over the test runs are measured. Based on the measured performance characteristics, actual write parameters are selected for use in writing actual data.

Selection can be (1) the best of the predesignated number of test runs, or (2) calibrated based on interpolation of the runs.

Based on design goals, one performance characteristic can be used as a proxy for good overall writing performance, such as jitter, block error rate (BLER), etc. Alternatively, a composite penalty function can be defined as a combination of performance characteristics, and the selection is based on the based on the composite penalty function.

By virtue of this arrangement, it is ordinarily possible to improve performance characteristics of the laser by calibrating multiple parameters of the laser in the field, thus allowing for the write parameters of the laser to be set and re-set after manufacture according to differences in the recording environment.

In another example aspect, laser write parameters in an optical drive are calibrated. There are means for setting a parameter range for the write parameters based on a recordable medium, and means for recording a number of test runs on the recordable medium while varying the write parameters. There are also means for measuring performance characteristics over the test runs. In addition, there are means for selecting actual write parameters for use in writing actual data based on the measured performance characteristics.

In still another example aspect, a computer-executable program calibrates laser write parameters in an optical drive. The program causes the computer to set a parameter range for the write parameters based on a recordable medium, and to record a number of test runs on the recordable medium while varying the write parameters. The program further causes the computer to measure write performance characteristics over the test runs. Based on the measured performance characteristics, the program selects actual write parameters for use in writing actual data.

This brief summary has been provided so that the nature of the disclosure may be understood quickly. A more complete understanding can be obtained by reference to the following detailed description and to the attached drawings.

DETAILED DESCRIPTION

Figure 1:
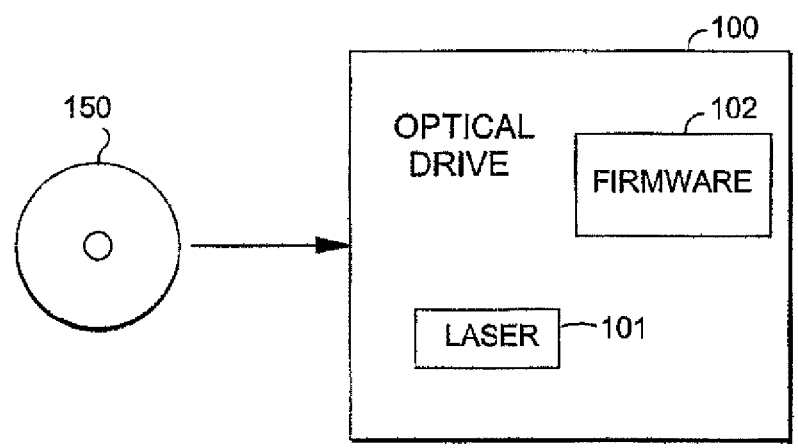
FIG. 1 illustrates an example of a disc-writing environment.

FIG. 1 depicts a simplified example embodiment of a disc-writing environment.

Briefly, as seen in FIG. 1, the disc-writing environment includes optical drive 100 and disc 150. Optical drive 100 comprises laser 101 and firmware 102.

Optical drive 100 uses one or more lasers to retrieve and/or store data on optical discs like CDs and DVDs. More specifically, the laser is used to encode or "burn" data into the disc by selectively heating parts of the disc to form burned "pits" and unburned "lands". The pits and lands can then be detected in order to read data from the disc. For rewritable media, the laser is used to melt a crystalline metal alloy in the recording layer of the disc. Some common types of optical drives include CD-RW, DVD±RW, and HD-DVD and Btu-ray drives.

Laser 101 is an optical laser used to write data to recordable media such as disc 150. Laser 101 can also read data from disc 150. For purposes of a more focused description, all of the various components of the laser unit are not shown, but a few components will be briefly described. For example, laser 101 includes an optical pickup unit or "pick-up head" including the semiconductor laser, a lens for guiding the laser beam, and photodiodes for detecting the light reflection from disc's surface. Two or more servomechanisms may be used to keep a distance of lens to disc, to ensure a laser beam is focused on a small laser spot on a disc, and to move the head along a disc's radius.

Numerous parameters of a laser can be adjusted and calibrated according to design goals for good writing performance. Example writing parameters of a laser include the power of the laser, the laser focus depth, the tilt of the objective lens, the radial offset, and write strategy parameters such as the width distribution, the interval between pulses, peakedness, amplitude, phase, frequency, inter-pulse separation, switch speed, the length or width of the pits and lands, and user-defined parameters, among many others. Certain laser parameters may produce improved quality with one type or brand of recordable media, whereas another set of parameters may work better with another type or brand of recordable media.

Firmware 102 controls laser 101. For example, firmware 102 may identify the type of recordable media, compute performance characteristics and parameters of the laser, perform mathematical operations, and control optical drive 100 so as to calibrate or re-calibrate the writing parameters of laser 101. Of course, firmware 102 may control various other processes in optical drive 100, such as disc loading and ejection and input/output.

Disc 150 is one example of a recordable medium that can be written to by optical drive 100. Numerous embodiments of disc 150 are possible, including a recordable CD-R, DVD-R, DVD+R, BD-R or HD DVD-R disc, rewritable CD-RW, DVD-RW, DVD+RW, DVD-RAM, BD-RE, HD DVD-RW, or HD DVD-RAM discs, and double-sided or double-layer versions of the above, among others.

Various manufacturers construct such recordable media, and characteristics of a disc often vary according to the manufacturer. To aid in writing to the medium, the manufacturer of disc 150 may include data on disc 150 regarding characteristics of disc 150. For example, disc 150 may include a reserved area storing address in pre-groove (ADIP) information containing tolerance information for the disc, such as the maximum level of laser power disc 150 can handle before producing unacceptable data. While ADIP information is thus useful in approximating a tolerable range of writing parameters, the ADIP information does not contain writing parameters to compensate for a specific optical drive and writing environment.

Figure 2:
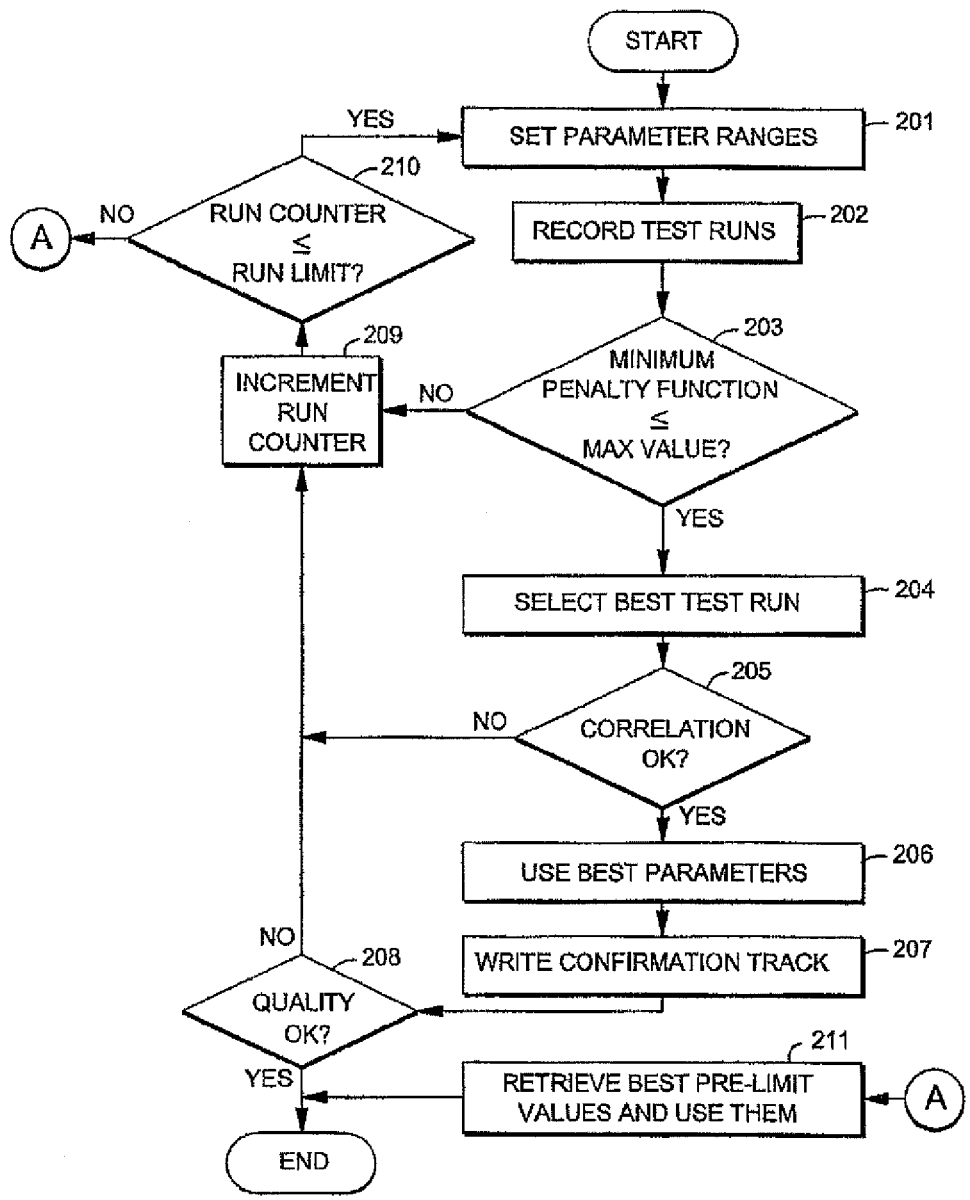
FIG. 2 illustrates an example of a process for calibrating parameters of an optical drive.

Therefore, an example process for calibrating writing parameters of a laser in an optical drive will now be described with respect to FIG. 2.

The process begins in step 201, where firmware 102 sets allowable ranges for varying the laser writing parameters of laser 101. As mentioned above, different recordable media can only tolerate certain ranges of laser characteristics while still producing acceptable output. Thus, the firmware sets the range of possible values for each laser writing parameter in accordance with disc 150, so that time and energy are not wasted by testing a laser writing parameter value which falls outside an allowable range. In one example embodiment, firmware 102 controls the laser 101 to read ADIP information from the disc 150, and the ADIP information includes information concerning the range of possible values for each writing parameter. Of course, other methods of accessing this information are possible, such as downloading this information from a network or separate computer. Once the ranges for each writing parameter of laser 101 have been set for disc 150, testing can begin.

Accordingly, in step 202, firmware controls laser 101 so as to record a predesignated number of test runs on disc 150 while certain parameters of laser 101 are varied in accordance with well known Design-of-Experiment (DOE) principles. For example, the parameters can be varied according to a Taguchi method or a Box-Behnken method, among others.

In one example embodiment, the number of test runs is based on the number of writing parameters that are being calibrated. More specifically, if a greater number of writing parameters are being observed and calibrated by firmware 102, a greater number of test runs might be preferred. On the other hand, attempting to calibrate too many parameters at once might lead to unacceptable computation time, use of system resources, or physical space taken up on disc 150 for conducting additional test runs. Of course, it is possible to construct optical drives that can handle more writing parameters at once.

In one example embodiment, laser 101 records the set number of test runs in test areas of disc 150 known as Error Correction Code (ECC) frames, so as not to take up space on disc 150 reserved for the user's data.

During the recording of the test runs, the selected variations of the parameters should be produced in a random order, so as to reduce or avoid inaccurate correlations between the output performance characteristics and conditions that are not based on writing parameters. For example, simply stepping laser power levels up in a linear fashion would lead to unacceptable correlations between performance characteristics and, for example, laser temperature or time, rather than the writing parameters of laser 101.

After the test runs, firmware 102 evaluates the performance characteristics produced by each test run, and stores this data in a memory along with the laser writing parameters of the test run. Example performance characteristics include the asymmetry of the HF signal which represents the relation between the smallest and largest symbol in the signal (or a similar parameter called "Beta" representing the relation between the AC and DC level of the HF signal), the block error rate (BLER), the amount of jitter, or various combinations of the run lengths of various pulses of the EFM signal, among many others.

Thus, firmware 102 stores data corresponding to input writing parameters which produced each test run, and the output performance characteristics of the test run. An illustrative example of such data is shown below in Table 1. In the example of Table 1, the writing parameters that were varied include the laser power ("power"), the write pulse duration using a castle write strategy for 3T marks ("ti3"), the initial pulse time ("ttop"), and the width of the last 4T pulse ("tlp4"). In the example of Table 1, the measured performance characteristics are the symmetry of the HF signal ("beta"), the block error rate ("BLER"), the jitter, the run lengths of the pit and land for 3T marks ("3T pit" and "3T land"), and the run lengths of the pit and land for 4T marks ("4T pit" and "4T land").

In addition, Table 1 also depicts a value "Penalty" for each test run. This value is a composite penalty value that depends on a combination of multiple ones of the above performance characteristics. The penalty function can differ in dependence on design goals for performance. For example, in keeping with one design goal, the penalty function might depend only on one performance characteristic such as BLER or jitter. In other design goals, there might be a composite penalty function that depends on combinations of more than one performance characteristic. In this example embodiment, the "penalty" is calculated in accordance with the following equation:

$$P = \Sigma_i^n(\beta_i-\beta)^2 + \Sigma_i^n(3T_{ipit}-3T_{pit})^2 + \Sigma_i^n(3T_{iland}-3T_{land})^2 + \Sigma_i^n(4T_{ipit}-4T_{pit})^2 + \Sigma_i^n(4T_{iland}-4T_{land})^2$$

In the above example embodiment, $\beta$ as well as $3T_{pit}$, $3T_{land}$, $4T_{pit}$ and $4T_{land}$ are expressed in terms of power and other write strategy parameters, and the variables with index "i" are measured data. As will be described further below, the objective of the overall procedure is to find a combination of the write parameters which are varied for which the penalty function P is minimum. In this particular example embodiment, the penalty function is an excellent representation of the total jitter.

Table 1 also illustrates an introductory track for Optimum Power Calibration (OPC) in which only the power of laser 101 is varied. The OPC track is an optional variation in order to obtain baseline characteristics according to the power level. Of course, numerous other parameters can be varied and numerous other characteristics can be measured, and neither the writing parameters nor the measured performance characteristics are limited to those shown in Table 1.

another set of test runs, to attempt to obtain better performance characteristics. Thus, the process proceeds to step 209 to increment a run counter (not shown) and potentially record another set of test runs. This process will be described in more detail below. On the other hand, if at least one test run produced a penalty value below the acceptable maximum, the process proceeds to step 204.

In step 204, firmware 102 chooses the test run which produced the best value for the penalty function of the selected performance characteristics. For example, using the values in Table 1, test run T15 will be selected because of its minimum penalty value.

In step 205, firmware 102 verifies that the correlation between the performance characteristics and the writing parameters of the selected test run are acceptable, using any number of mathematical methods available to one of skill in the art. If the correlation is not acceptable, the process proceeds to step 209. Otherwise, if the correlation is acceptable, the process proceeds to step 206.

In step 206, firmware 102 uses the writing parameters of the selected test run. Specifically, laser 101 is configured to the new writing parameters corresponding to the selected test run. Thus, subsequent writing of actual data with the laser is performed according to these new writing parameters, and should lead to similarly improved performance characteristics.

Before writing data to the recordable medium, however, the process may proceed to step 207, in which a confirmation track is written with the new writing parameters. In this regard, step 207 is optional, since it can be expected that the confirmation track will yield the same performance characteristics as the selected best test run. The confirmation track should be written in an ECC frame or other blank area of the disc, so as not to interfere with disc space for data. Writing the

TABLE 1

| Track | Power | ti3 | ttop | tlp4 | beta | BLEB | Jitter | 3T pit | 3T land | 4T pit | 4T land | Penalty |
|---|---|---|---|---|---|---|---|---|---|---|---|---|
| OPC | 757 | 80 | 50 | 30 | −4.8 | 19 | 10.3 | −11.5 | 3.6 | 2.5 | 6.9 | 146 |
| T1 | 840 | 77 | 50 | 34 | 2.4 | 8 | 9.5 | −8.1 | 0.2 | 2.4 | 8.1 | 19 |
| T2 | 840 | 76 | 51 | 33 | 1.2 | 10 | 10.0 | −8.8 | −0.4 | 1.9 | 8.1 | 26 |
| T3 | 880 | 77 | 54 | 33 | 6.5 | 10 | 8.7 | −6.8 | −0.7 | 1.2 | 8.1 | 11 |
| T4 | 880 | 80 | 51 | 30 | 8.3 | 6 | 8.7 | −2.0 | −1.4 | −2.4 | 7.8 | 34 |
| T5 | 820 | 77 | 51 | 31 | −0.4 | 7 | 9.9 | −10.6 | 0.9 | 1.9 | 8.0 | 56 |
| T6 | 900 | 77 | 53 | 30 | 8.2 | 11 | 14.4 | −5.7 | −0.3 | 0.7 | 7.9 | 19 |
| T7 | 820 | 80 | 54 | 34 | 2.3 | 11 | 9.2 | 7.4 | 0.2 | 2.3 | 8.0 | 16 |
| T8 | 900 | 76 | 54 | 31 | 7.2 | 77 | 8.7 | −7.4 | −1.2 | 0.5 | 8.3 | 16 |
| T9 | 820 | 76 | 50 | 30 | −1.5 | 12 | 10.0 | −11.5 | 1.4 | 1.9 | 8.0 | 79 |
| T10 | 900 | 80 | 50 | 33 | 9.9 | 8 | 9.0 | −1.7 | −1.4 | −1.9 | 7.2 | 51 |
| T11 | 900 | 79 | 51 | 34 | 9.4 | 6 | 8.7 | −3.2 | −1.4 | −1.0 | 7.4 | 34 |
| T12 | 840 | 80 | 53 | 31 | 4.7 | 8 | 8.2 | −4.5 | −0.3 | −0.3 | 8.0 | 3 |
| T13 | 820 | 79 | 53 | 33 | 1.8 | 9 | 9.0 | −8.1 | 0.1 | 1.8 | 8.0 | 19 |
| T14 | 880 | 79 | 50 | 31 | 7.6 | 7 | 8.3 | −2.6 | −0.9 | −1.9 | 7.7 | 23 |
| T15 | 840 | 79 | 54 | 30 | 4.0 | 6 | 8.1 | −6.5 | −0.4 | 0.1 | 8.0 | 2 |
| T16 | 880 | 76 | 53 | 34 | 5.7 | 21 | 9.2 | −8.3 | −1.0 | 1.8 | 8.0 | 17 |

In this regard, it is possible that not all writing parameters will produce performance characteristics that are optimum, or even acceptable. Therefore, the set of test runs must be narrowed down to those test runs that produced acceptable values for the penalty function.

Accordingly, in step 203, firmware 102 computes the penalty function for every test run based on the measured performance characteristics, and determines whether any test run has produced a penalty function below a preset maximum.

If no test run has produced an acceptable penalty value (i.e. one below the maximum), it is ordinarily preferable to record confirmation track provides an additional safeguard to help ensure that the calibrated writing strategy parameters will yield an acceptable output.

In step 208, firmware 102 examines the confirmation track with laser 101 to determine whether the quality of the output is acceptable. If, for any reason, the quality of the confirmation track is unsatisfactory, then no data should be written to the disc with these parameters, and the process proceeds to step 209 to re-run the tests. On the other hand, if the quality of the confirmation track is acceptable, then the writing laser can proceed to write data to the recordable medium according to the new writing parameters.

Thus, according to the above steps, firmware 102 calibrates the writing parameters of laser 101, based on the test runs conducted with disc 150.

As indicated above, if one or more characteristics of a set of test runs is unacceptable, the process proceeds to step 209. For example, the process proceeds to step 209 when penalty function values are too high for all test runs, or if no selected performance characteristics are acceptable for any of the test runs. In such a situation, it might useful to try again with one or more extra sets of test runs, in order to determine better parameters for the laser, if possible.

First, however, firmware 102 increments a run counter in step 209. The purpose of the counter is to ensure that the test run process does not continue indefinitely. In particular, the type of media simply may not correspond well with optical drive 100, and it may be impossible, unlikely, or too time-consuming to reach a test run that yields optimum output. Thus, a counter keeps track of how many cycles of test runs have been completed, and a maximum value of cycles is set as a "cut-off" for further sets of test runs.

If it is determined in step 210 that the run limit has not yet been reached, the process proceeds to step 201 to re-set the parameter ranges for testing, and the calibration process repeats. If, on the other hand, the run limit has been reached, then the process continues to step 211.

In step 211, firmware 102 retrieves the test run with the best performance characteristics from the test runs conducted before the run limit was reached, and uses them. Accordingly, even in a worst-case scenario, it is still likely that laser 101 is calibrated to writing parameter values at least as good as that if no calibration had been conducted at all.

Figure 3:
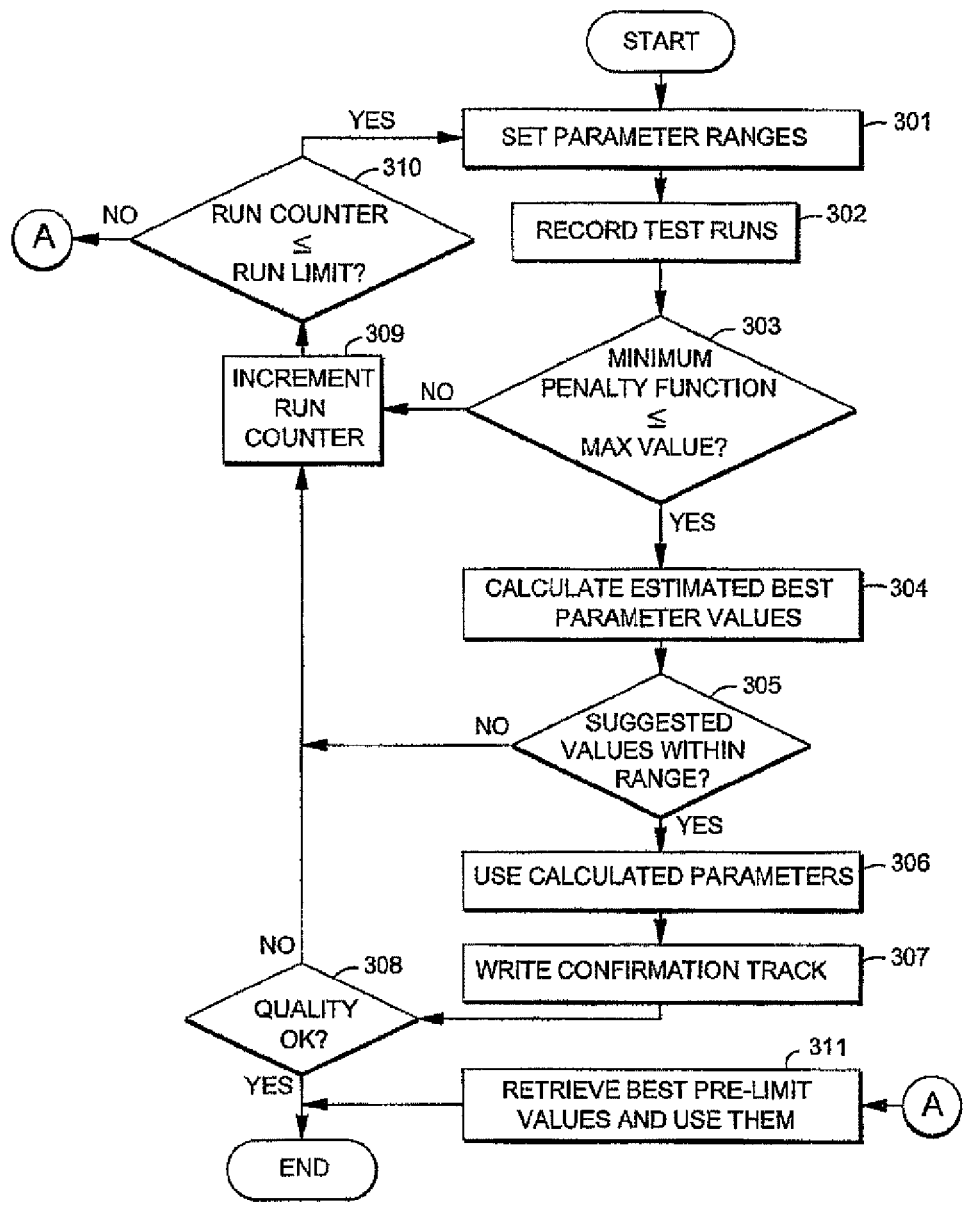
FIG. 3 illustrates an example of another process for calibrating parameters of an optical drive.

Another example process for calibrating a writing laser will now be described with respect to FIG. 3. In this regard, certain steps may correspond similarly to steps described above with respect to FIG. 2, and thus, for purposes of simplicity, corresponding details will not be described again.

The process begins in step 301, where firmware 102 sets ranges for the laser writing parameters based on disc 150.

In step 302, firmware controls laser 101 so as to record a set number of test runs on disc 150 while varying the parameters of laser 101 within the allowable ranges according to a DOE method, as described above.

In step 303, firmware 102 computes a penalty value for each test run and determines whether the minimum penalty value selected from all test runs falls below a preset maximum. As discussed above, the nature of the penalty function can vary in dependence on design goals, and can depend on various combinations of performance characteristics. If no test runs have produced a penalty value below the acceptable maximum, the process proceeds to step 309. On the other hand, if at least one test run produced a penalty value below the acceptable maximum, the process proceeds to step 304.

In step 304, firmware 102 uses numerical regression or another mathematical approximation to calculate an estimate of writing parameters that will produce the best possible values for the penalty function. Thus, rather than selecting a single best run, as in the example of FIG. 2, the process mathematically approximates the "best" writing parameters by minimizing the penalty function. This can be accomplished by several mathematical methods including, for example, interpolation, the method of least squares, and so on.

The selected performance characteristics, of course, influence the outcome of the approximation. For example, firmware 102 could calculate a penalty function so as to minimize jitter, whereas another penalty function could be computed so as to minimize BLER, or even a combination of several performance characteristics. In any case, once firmware 102 estimates projected values for the writing parameters, the process proceeds to step 305.

In step 305, firmware 102 determines whether the writing parameters estimated in step 306 are within the allowable range of writing parameters for disc 150. Put another way, firmware 102 must verify that the estimated writing parameters are actually usable on disc 150. For example, firmware 102 may estimate a power level of 20 mW in step 306, whereas disc 150 can only handle up to 15 mW (as indicated, for example, by the disc's ADIP information). If the estimated values fall outside the possible range of parameters, the parameters cannot be used, and the process proceeds to step 309 to (potentially) re-record another set of test runs. On the other hand, if the estimated parameters fall within the allowable ranges, the process proceeds to step 306.

In step 306, firmware 102 uses the calculated writing parameters. Specifically, laser 101 is configured to the calculated writing parameters. Thus, subsequent writing of actual data with the laser is performed according to these characteristics, and should lead to the improved performance characteristics estimated by firmware 102.

Before proceeding with writing data to the recordable medium, however, the process proceeds to step 307, in which a continuation track is written with the new writing parameters. For example, using the method of least squares for regression and the values from the test runs T1 to T16 in Table 1, one might arrive at the following confirmation track writing parameters and performance characteristics:

| Track | Power | Ti3 | Ttop | Tip4 | Beta | BLEB | Jitter | 3T pit | 3T land | 4T pit | 4T land | Penalty |
|---|---|---|---|---|---|---|---|---|---|---|---|---|
| Con | 829 | 81 | 55 | 30 | 5.1 | 16 | 8.3 | −4.4 | −0.6 | −0.5 | 8.0 | 2 |

In step 308, the confirmation track is examined to determine whether the quality of the output produced using the calibrated writing parameters is acceptable. If the quality of the confirmation track is unsatisfactory, the process proceeds to step 309 to re-run the tests. In this regard, steps 309 to 311 correspond similarly to steps 209 to 211, and accordingly will not be described here further.

On the other hand, if the quality of the confirmation track is acceptable, then the process ends, and the writing laser can proceed to write data to the recordable medium according to the new laser writing parameters.

By virtue of the above-described example embodiments, it is ordinarily possible to improve performance characteristics of the writing laser by calibrating various parameters of the writing laser in the optical drive, thus allowing for the writing parameters of the laser to be set and re-set after manufacture according to differences in the recording environment.

Figure 4A:
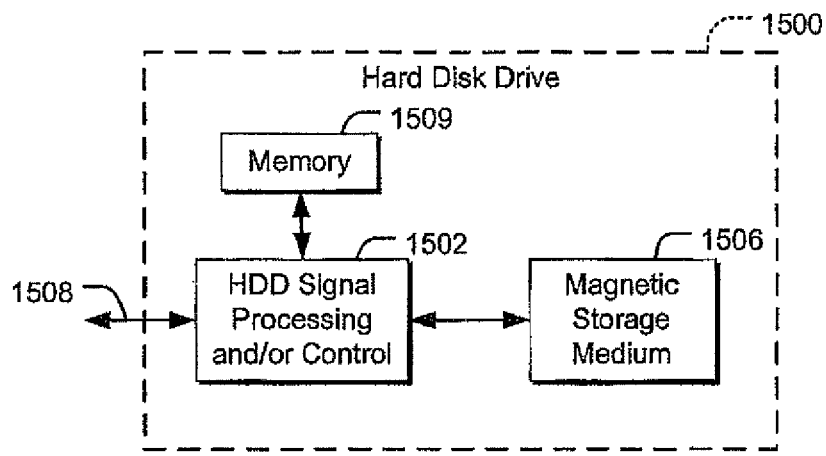
FIG. 4A is a block diagram showing an example embodiment in a hard disk drive system.

Referring now to FIGS. 4A-4H, various exemplary implementations of the present invention are shown. Referring to FIG. 4A, the present invention may be embodied in a hard disk drive system (HDD) 1500. The present invention may implement either or both signal processing and/or control circuits, which are generally identified in FIG. 4A at 1502. In some implementations, signal processing and/or control circuit 1502 and/or other circuits (not shown) in HDD 1500 may process data, perform coding and/or encryption, perform calculations, and/or format data that is output to and/or received from a magnetic storage medium 1506.

HDD 1500 may communicate with a host device (not shown) such as a computer, mobile computing devices such as personal digital assistants, cellular phones, media or MP3 players and the like, and/or other devices via one or more wired or wireless communication links 1508. HDD 1500 may be connected to memory 1509, such as random access memory (RAM), a low latency nonvolatile memory such as flash memory, read only memory (ROM) and/or other suitable electronic data storage.

Figure 4B:
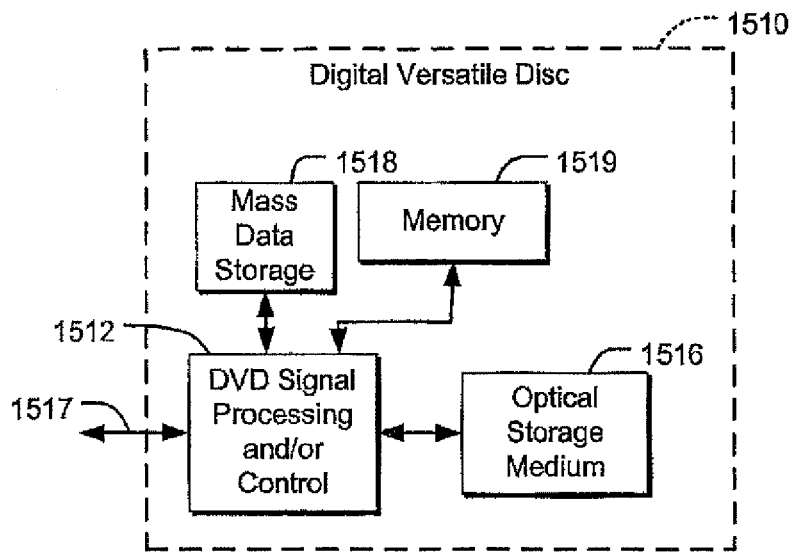
FIG. 4B is a block diagram of an example embodiment in a DVD drive.

Referring now to FIG. 4B, the present invention may be embodied in a digital versatile disc (DVD) drive 1510. The present invention may implement either or both signal processing and/or control circuits, which are generally identified in FIG. 4B at 1512, and/or mass data storage 1518 of DVD drive 1510. Signal processing and/or control circuit 1512 and/or other circuits (not shown) in DVD 1510 may process data, perform coding and/or encryption, perform calculations, and/or format data that is read from and/or data written to an optical storage medium 1516. In some implementations, signal processing and/or control circuit 1512 and/or other circuits (not shown) in DVD 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD 1510 may communicate with mass data storage 1518 that stores data in a nonvolatile manner. Mass data storage 1518 may include a hard disk drive system (HDD) such as that shown in FIG. 4A. The HDD may be a mini HDD that includes one or more platters having a diameter that is smaller than approximately 1.8". DVD 1510 may be connected to memory 1519, such as RAM, ROM, low latency nonvolatile memory such as flash memory, and/or other suitable electronic data storage.

Figure 4C:
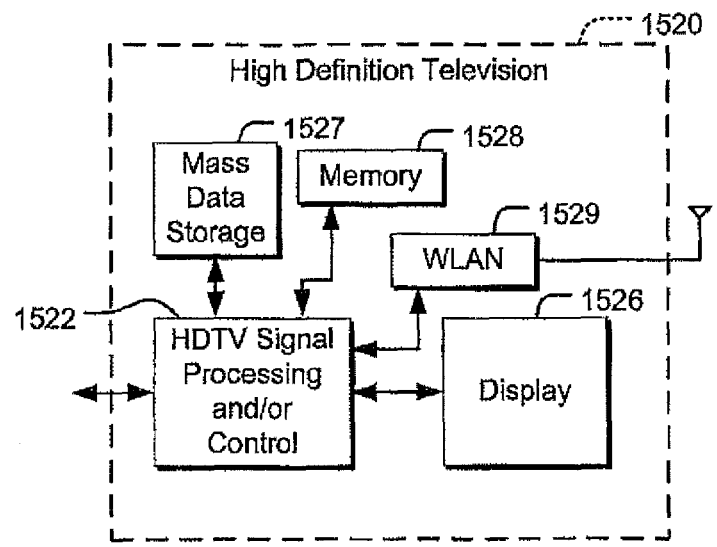
FIG. 4C is a block diagram of an example embodiment in a high definition television (HDTV).

Referring now to FIG. 4C, the present invention may be embodied in a high definition television (HDTV) 1520. The present invention may implement either or both signal processing and/or control circuits, which are generally identified in FIG. 4C at 1522, a WLAN interface and/or mass data storage of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/or perform any other type of HDTV processing that may be required.

HDTV 1520 may communicate with mass data storage 1527 that stores data in a nonvolatile manner such as optical and/or magnetic storage devices. At least one hard disk drive system (HDD) may have the configuration shown in FIG. 4A and/or at least one DVD may have the configuration shown in FIG. 4B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via a WLAN network interface 1529.

Figure 4D:
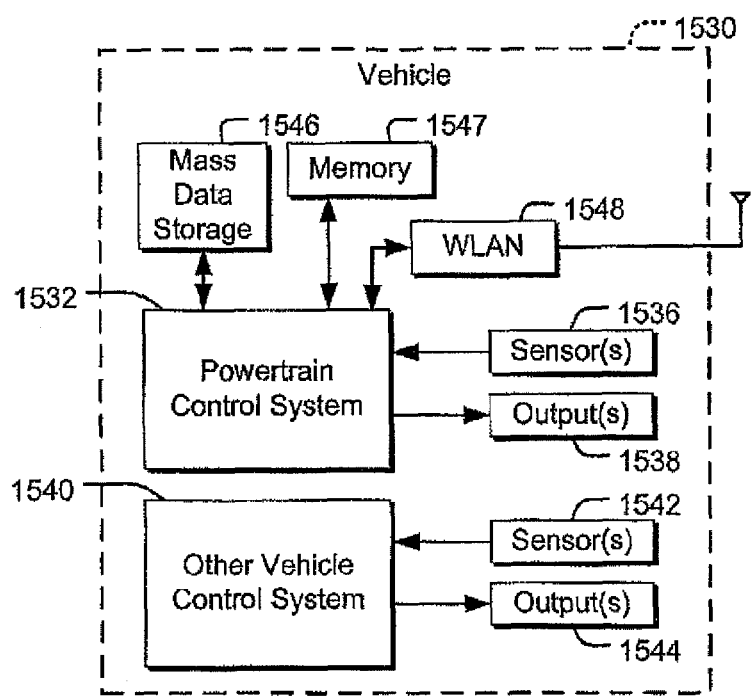
FIG. 4D is a block diagram of an example embodiment in a vehicle control system.

Referring now to FIG. 4D, the present invention may be embodied in a control system of a vehicle 1530, a WLAN interface and/or mass data storage of the vehicle control system. In some implementations, the present invention implements a powertrain control system 1532 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices for example a hard disk drive system (HDD) and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via a WLAN network interface 1548. The control system 1540 may also include mass data storage, memory and/or a WLAN interface (all not shown).

Figure 4E:
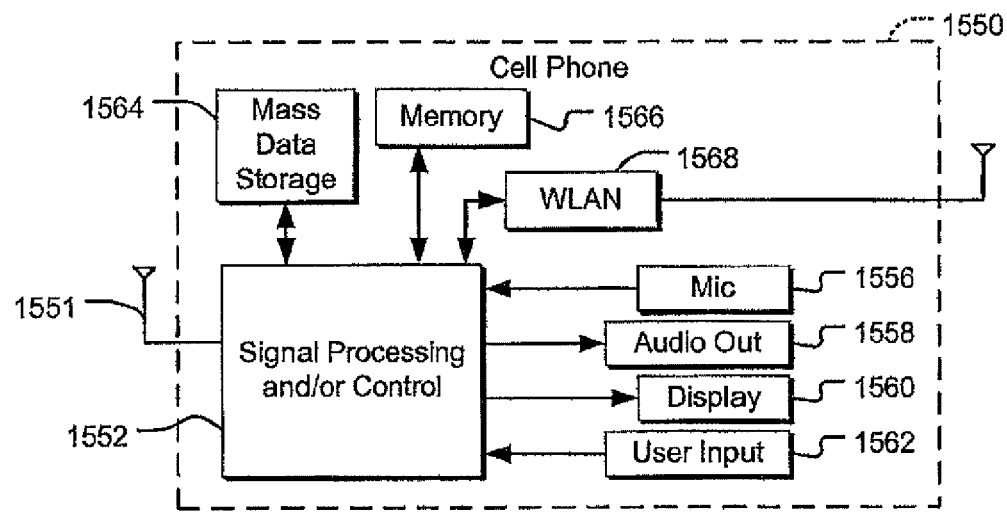
FIG. 4E is a block diagram of an example embodiment in a cellular or mobile phone.

Referring now to FIG. 4E, the present invention may be embodied in a cellular phone system 1550 that may include a cellular antenna 1551. The present invention may implement either or both signal processing and/or control circuits, which are generally identified in FIG. 4E at 1552, a WLAN interface and/or mass data storage of the cellular phone system 1550. In some implementations, cellular phone system 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone system 1550 may process data, perform coding and/or encryption, perform calculations, format data and/or perform other cellular phone system functions.

Cellular phone system 1550 may communicate with mass data storage 1564 that stores data in a nonvolatile manner such as optical and/or magnetic storage devices for example a hard disk drive system (HDD) and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Cellular phone system 1550 may be connected to memory 1566 such as RAM, ROM, low latency nonvolatile memory such as flash memory and/or other suitable electronic data storage. Cellular phone system 1550 also may support connections with a WLAN via a WLAN network interface 1568.

Figure 4F:
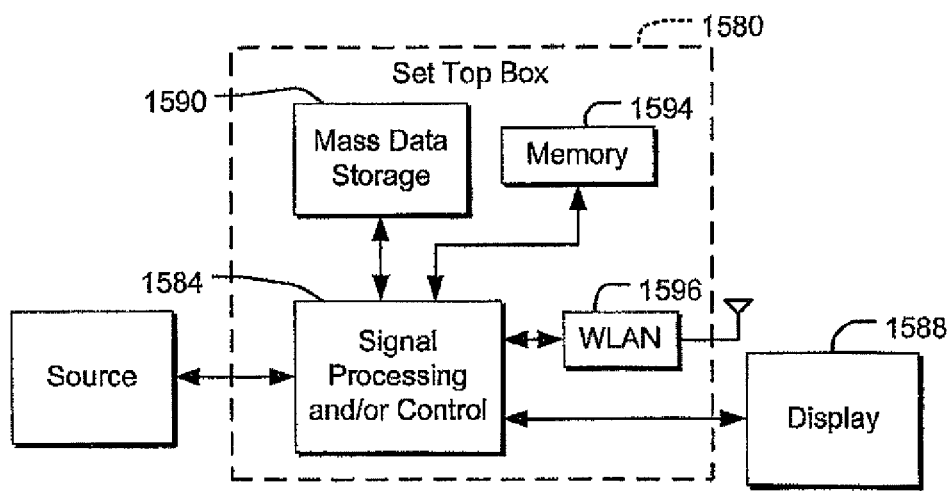
FIG. 4F is a block diagram of an example embodiment in a set-top box (STB).

Referring now to FIG. 4F, the present invention may be embodied in a set top box 1580. The present invention may implement either or both signal processing and/or control circuits, which are generally identified in FIG. 4F at 1584, a WLAN interface and/or mass data storage of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices for example a hard disk drive system (HDD) and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via a WLAN network interface 1596.

Figure 4G:
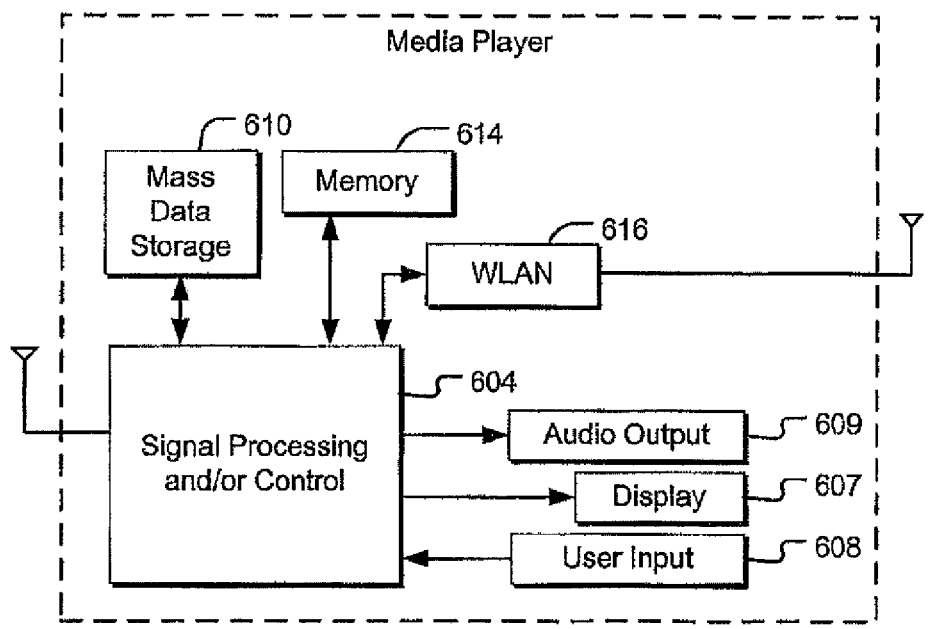
FIG. 4G is a block diagram of an example embodiment in a media player.

Referring now to FIG. 4G, the present invention may be embodied in a media player 600. The present invention may implement either or both signal processing and/or control circuits, which are generally identified in FIG. 4G at 604, a WLAN interface and/or mass data storage of the media player 600. In some implementations, media player 600 includes a display 607 and/or a user input 608 such as a keypad, touchpad and the like. In some implementations, media player 600 may employ a graphical user interface (GUI) that typically employs menus, drop down menus, icons and/or a point-and-click interface via display 607 and/or user input 608. Media player 600 further includes an audio output 609 such as a speaker and/or audio output jack. Signal processing and/or control circuits 604 and/or other circuits (not shown) of media player 600 may process data, perform coding and/or encryption, perform calculations, format data and/or perform any other media player function.

Media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example a hard disk drive system (HDD) and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Media player 600 may be connected to memory 614 such as RAM, ROM, low latency nonvolatile memory such as flash memory and/or other suitable electronic data storage. Media player 600 also may support connections with a WLAN via a WLAN network interface 616. Still other implementations in addition to those described above are contemplated.

Figure 4H:
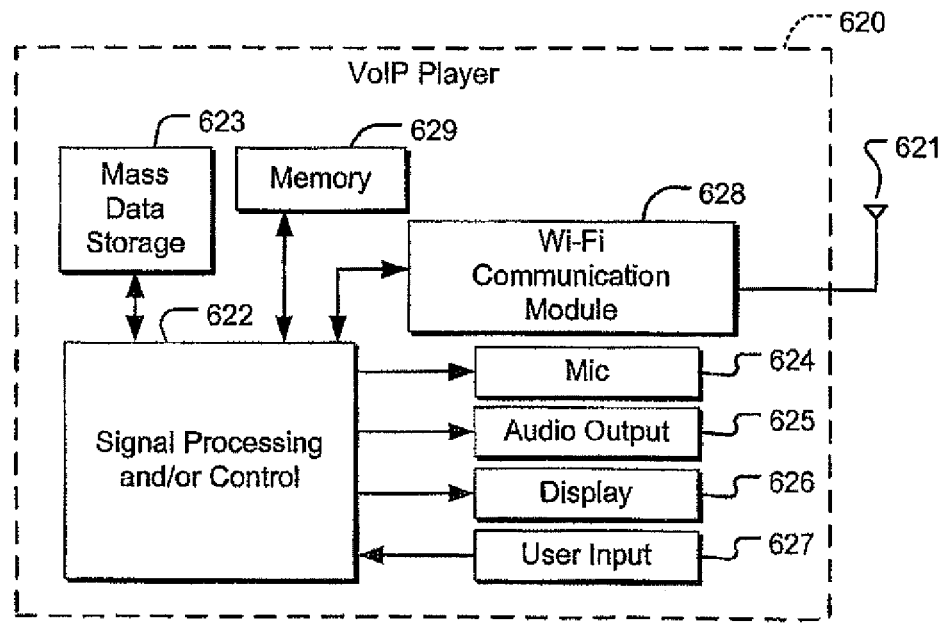
FIG. 4H is a block diagram of an example embodiment in a Voice-over Internet Protocol (VoIP) player.
Figure 5:
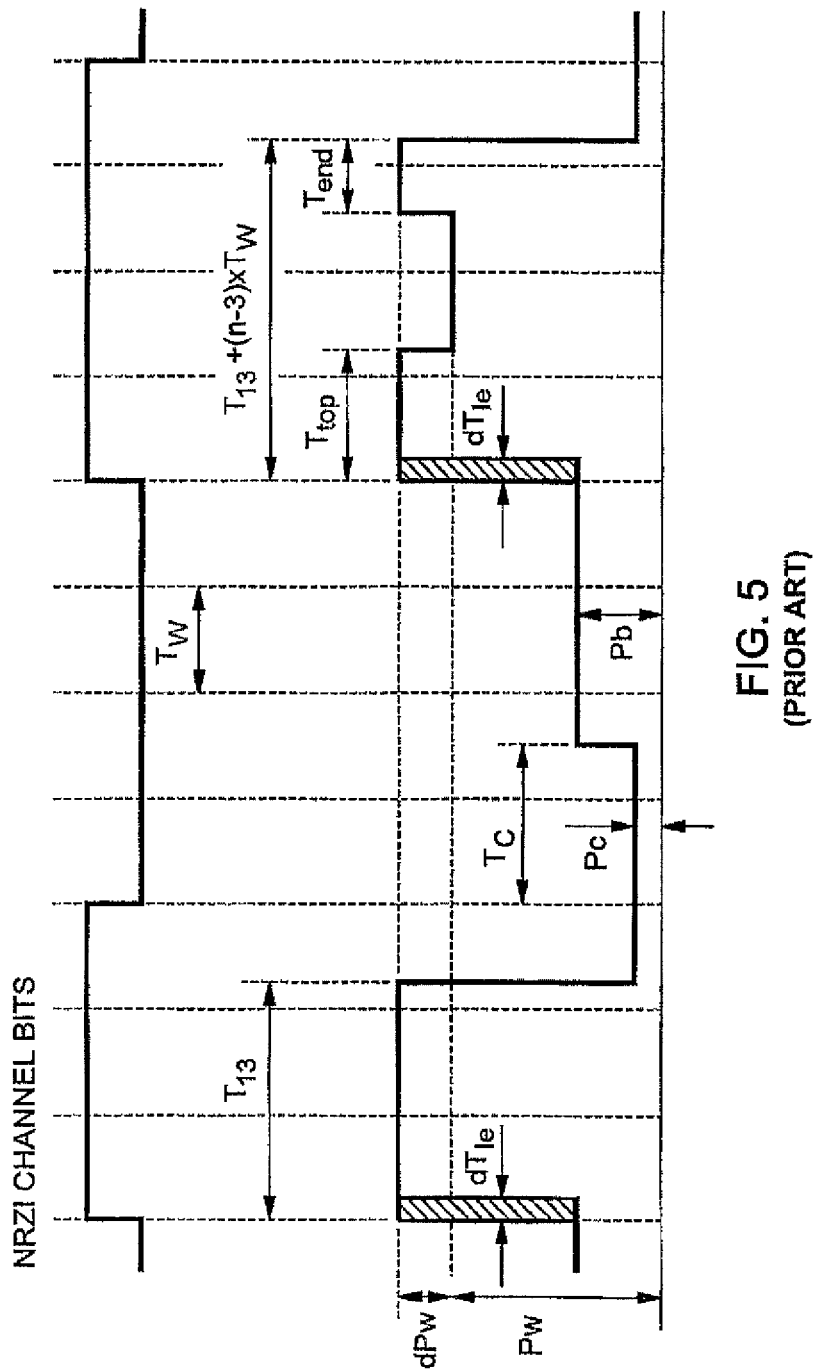
FIG. 5 is a diagram illustrating sample write parameters on a castle waveform.

Referring to FIG. 4H, the present invention may be embodied in a Voice over Internet Protocol (VoIP) phone 620 that may include an antenna 621. The present invention may implement either or both signal processing and/or control circuits, which are generally identified in FIG. 4H at 622, a wireless interface and/or mass data storage of the VoIP phone 623. In some implementations, VoIP phone 620 includes, in part, a microphone 624, an audio output 625 such as a speaker and/or audio output jack, a display monitor 626, an input device 627 such as a keypad, pointing device, voice actuation and/or other input devices, and a Wireless Fidelity (Wi-Fi) communication module 628. Signal processing and/or control circuits 622 and/or other circuits (not shown) in VoIP phone 620 may process data, perform coding and/or encryption, perform calculations, format data and/or perform other VoIP phone functions.

VoIP phone 620 may communicate with mass data storage 623 that stores data in a nonvolatile manner such as optical and/or magnetic storage devices, for example a hard disk drive system (HDD) and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". VoIP phone 620 may be connected to memory 629, which may be a RAM, ROM, low latency nonvolatile memory such as flash memory and/or other suitable electronic data storage. VoIP phone 620 is configured to establish communications link with a VoIP network (not shown) via Wi-Fi communication module 628.

Example aspects of the disclosure have been described above with respect to particular illustrative embodiments. It is understood that the disclosure is not limited to the above-described embodiments and that various changes and modifications may be made by those skilled in the relevant art without departing from the spirit and scope of the disclosure.

What is claimed is:

1. A method for calibrating write parameters in an optical drive, the method comprising:
    measuring each write performance characteristic corresponding to each of a plurality of test runs recorded on a recordable medium;
    determining a value calculated by squaring value differences between run lengths of pits or between run lengths of lands of the recordable medium during each of the test runs; and
    selecting actual write parameters for use in writing actual data based on the value.

2. The method according to claim 1, further comprising: setting a parameter range for the write parameters based on the recordable medium.

3. The method according to claim 2, further comprising: verifying that the write parameters are within the set parameter range.

4. The method according to claim 1, further comprising: varying the write parameters while recording the test runs on the recordable medium.

5. The method according to claim 4, wherein the write parameters are varied according to a Design-of-Experiments (DOE) methodology.

6. The method according to claim 1, wherein the write parameters are selected based on a test run which includes a best value(s).

7. The method according to claim 1, further comprising: calibrating a laser of the optical drive according to a numerical interpolation of the write parameters.

8. The method according to claim 1, further comprising:
    recording a confirmation track according to the selected actual write parameters; and
    confirming that the performance characteristics fall within a predefined range.

9. The method according to claim 1, wherein the actual write parameters are selected so as to minimize the value.

10. The method according to claim 1, further comprising: counting a number of the test runs.

11. An apparatus for calibrating write parameters in an optical drive, the apparatus comprising:
   a measuring unit configured to
      measure each write performance characteristic corresponding to each of a plurality of test runs recorded on a recordable medium, and
      determine a value calculated by squaring value differences between run lengths of pits or between run lengths of lands of the recordable medium during each of the test runs; and
   a selecting unit configured to select actual write parameters for use in writing actual data, based on the value.

12. The apparatus according to claim 11, further comprising:
   a setting unit configured to set a parameter range for the write parameters based on the recordable medium.

13. The apparatus according to claim 12, further comprising:
   a verification unit configured to verify that the write parameters are within the set parameter range.

14. The apparatus according to claim 11, further comprising:
   a recording unit configured to vary the write parameters while recording the test runs on the recordable medium.

15. The apparatus according to claim 14, wherein the write parameters are varied according to a Design-of-Experiments (DOE) methodology.

16. The apparatus according to claim 11, wherein the write parameters are selected based on a test run which includes a best value(s).

17. The apparatus according to claim 11, wherein a laser of the optical drive is calibrated according to a numerical interpolation of the write parameters.

18. The apparatus according to claim 11, wherein the actual write parameters are selected so as to minimize the value.

19. The apparatus according to claim 11, further comprising:
   a run counter for counting a number of the test runs.

* * * * *